US008115806B2

(12) United States Patent
Osawa et al.

(10) Patent No.: US 8,115,806 B2
(45) Date of Patent: Feb. 14, 2012

(54) IMAGE FORMING METHOD AND MICROSCOPE DEVICE

(75) Inventors: Hisao Osawa, Kashiwa (JP); Yumiko Ouchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 1169 days.

(21) Appl. No.: 11/886,847

(22) PCT Filed: Mar. 20, 2006

(86) PCT No.: PCT/JP2006/305564
§ 371 (c)(1),
(2), (4) Date: Sep. 21, 2007

(87) PCT Pub. No.: WO2006/109448
PCT Pub. Date: Oct. 19, 2006

(65) Prior Publication Data
US 2010/0141750 A1     Jun. 10, 2010

(30) Foreign Application Priority Data

Mar. 30, 2005  (JP) ................................. 2005-096920
Oct. 6, 2005   (JP) ................................. 2005-293658

(51) Int. Cl.
*H04N 7/18*   (2006.01)
*H04N 5/253*  (2006.01)
*A61B 1/04*   (2006.01)

(52) U.S. Cl. ................ 348/63; 348/61; 348/62; 348/75; 348/76; 348/79

(58) Field of Classification Search .............. 348/61–63, 348/75–76, 79
See application file for complete search history.

(56) References Cited

U.S. PATENT DOCUMENTS

| 5,943,133 A | 8/1999 | Zeylikovich et al. ......... 356/354 |
| 6,239,909 B1 * | 5/2001 | Hayashi et al. ................ 359/569 |
| 2004/0090523 A1 * | 5/2004 | Kondo et al. ................... 348/46 |

FOREIGN PATENT DOCUMENTS

| JP | 8-149458 | 6/1996 |
| JP | 11-242189 | 9/1999 |
| JP | 2003-009181 | 1/2003 |

OTHER PUBLICATIONS

Frohn, et al. "True optical resolution beyond the Rayleigh limit achieved by standing wave illumination". PNAS vol. 97. No. 13. Jun. 20, 2000. p. 7232-7236.
W. Lukosz. "Optical Systems with Resolving Powers Exceeding the Classical Limit. II" Journal of the Optical Society of America. vol. 57. No. 7. Jul. 1967. p. 932-941.
Zeylikovich, I. et al., *Heterodyne Grating—Generated Scan Correlation Interferometry for Reflectometry and Signal-Processing Applications*, Optics Letters, vol. 22, No. 16, Aug. 15, 1997, pp. 1259-1261.

* cited by examiner

*Primary Examiner* — Karen Tang
(74) *Attorney, Agent, or Firm* — Morgan, Lewis & Bockius LLP

(57) ABSTRACT

More images than spatial modulation components of a lighting light are acquired, and a least square method is applied to the imaged plurality of images to obtain signal components. Accordingly, a ultra-resolution microscope which uses a spatially-modified lighting light to illuminate a sample, arithmetic-processes acquired images to thereby demodulate a given spatial modulation, and obtains a high-resolution sample image, wherein a high-resolution image reduced in noise components can be obtained.

9 Claims, 1 Drawing Sheet

IMAGE FORMING METHOD AND MICROSCOPE DEVICE

TECHNICAL FIELD

The present invention relates to an image forming method and a microscope device.

BACKGROUND ART

The resolution of an optical microscope is determined by the numerical aperture and wavelength of the objective lens. Generally, it has been considered that the only method for increasing the resolution is to shorten the wavelength or increase the numerical aperture. Meanwhile, there is a demand to observe samples at a resolution higher than that determined by the numerical aperture and wavelength.

One technique for meeting this demand is a technique called "grating super-resolution" indicated by W. Lukosz in "Optical systems with resolving powers exceeding the classical limit. II," Journal of the Optical Society of America, Vol. 37, No. 7 (1967). In this method, an optical microscope with a high resolution is constructed in which a sample image is spatially modulated by a diffraction grating placed in the vicinity of the object of observation, the spatial frequency component that cannot pass through a focusing optical system that is present between the sample and an image pickup element is conducted to the image pickup element, and this component is demodulated by the diffraction grating in the vicinity of the image pickup element. As Lukosz himself recognizes, this is not realistic; as a more realistic microscope construction, however, there is the microscope construction introduced by (for example) J. T. Frohn et al., in "True optical resolution beyond the Rayleigh limit achieved by standing wave illumination," PNAS, Vol. 97, No. 13.

With regard to this microscope construction and image processing, for example, a method is described in Japanese Laid-Open Patent Application No. H11-242189 in which an image with a high resolution is obtained by providing a means for modulating the spatial frequency of the illuminating light in the vicinity of the sample that is being observed in the illumination optical system, acquiring a plurality of picked-up images while modulating the spatial frequency, and demodulating the plurality of picked-up images. In the demodulation method described in Japanese Laid-Open Patent Application No. H11-242189, an image is formed by linear calculations on the basis of the plurality of picked-up images.

However, in the demodulation method described in Japanese Laid-Open Patent Application No. H11-242189, no consideration is given to the contribution of the noise that is contained in the picked-up images. Accordingly, there is a possibility that the image that is obtained by demodulation will be erroneous because of the effects of the noise component.

Generally, an optical signal that is output from a photodetector contains noise components of dark current noise, thermal noise, and shot noise. If the image pickup environment is constant, dark current noise is noise which does not depend on other conditions, and which shows a variation in the vicinity of a substantially constant value. Thermal noise is a noise component that depends on the image pickup environment and image pickup conditions. Shot noise is noise which is not greatly affected by the image pickup environment or image pickup conditions, but which greatly depends on the signal strength.

The picked-up image always contains noise components that depend on the signal strength and noise components that do not depend on the signal strength; especially in picked-up images of samples that are not bright, both of these noise components have a relative magnitude that cannot be ignored. Accordingly, without proper removal of the noise components, practically sufficient image recovery is difficult. Consequently, in order to accomplish the pickup of a bright image in microscopic observation at a high magnification, it is necessary to increase the light density on the sample by increasing the intensity of the light source or the like. On the other hand, this leads to the problem of considerable damage to the sample.

In a structured illumination microscopic technique, as is also described in Japanese Laid-Open Patent Application No. H11-242189, signal components in the vicinity of the focal plane can be selectively extracted when samples that have a thickness or height are observed. It is known that blurring from outside the focal depth, which could not be removed in the case of conventional microscopes, can be removed during image processing, and that a high resolution in the direction of the optical axis can also be obtained. However, in cases where samples that have such a thickness are observed, signals from outside the focal depth that are removed in image processing are admixed with the signal prior to signal processing, and also become a source of noise; accordingly, the following problem arises: namely, the noise component that depends on the signal strength becomes relatively larger with respect to the image components following image processing.

DISCLOSURE OF THE INVENTION

It is an object of the present invention to obtain images that have a high resolution, in which the noise component is lowered.

The present invention provides an image forming method in which a sample is illuminated by spatially modulated illuminating light, light from the sample illuminated by this illuminating light is focused as an image, and a sample image is created by image calculation processing from the image thus acquired, wherein more images than the spatially modulated components of the illuminating light on the sample are acquired, and a sample image is created by applying the method of least squares to the plurality of images that are picked up.

Furthermore, the present invention provides a microscope device comprising a light source, an illumination optical system that illuminates the sample with light from this light source, a diffraction grating that is disposed in a position in the illumination optical system that is optically conjugate with the sample, a modulating device that modulates the diffraction grating, and that illuminates the sample with spatially modulated light, an image pickup means that picks up spatially modulated sample images from the sample, and an image forming device that forms an image of the sample by applying the method of least squares to more images than the spatially modulated components of the illuminating light on the sample, which are picked up by the image pickup means.

BEST MODE FOR CARRYING OUT THE INVENTION

Figure 1:
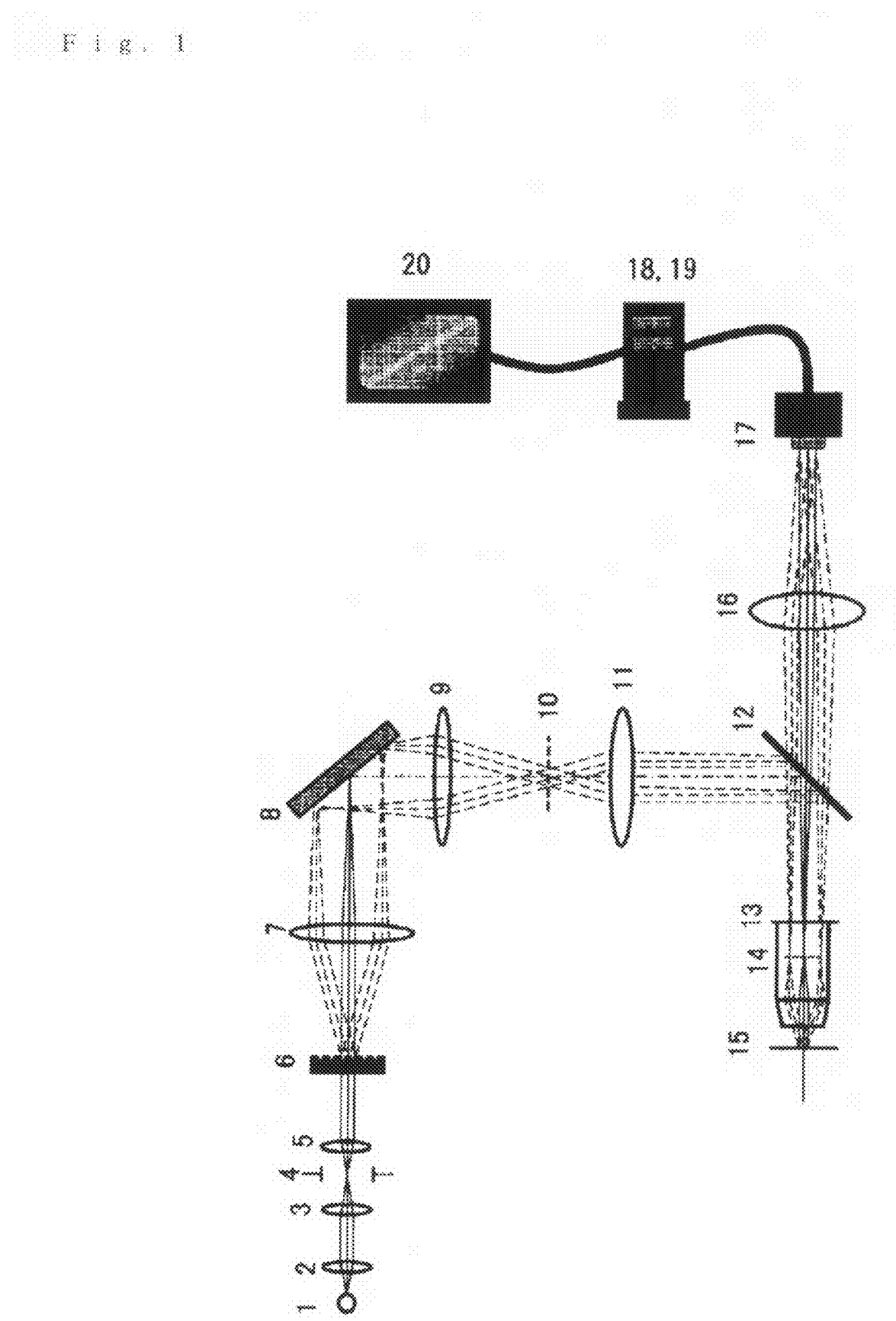
FIG. 1 is an overall schematic diagram of the microscope device described in a first working configuration.

FIG. 1 shows an example of the construction of a microscope that modulates the phase of the illuminating light. In order from the light source, the illumination optical system is constructed from a lamp light source 1, a collector lens 2, a relay lens 3, an opening diaphragm 4, a field lens 5, a diffraction grating 6, a condenser lens 7, a return mirror 8 disposed in a pupil-conjugate position, a relay lens 9, a visual field diaphragm 10, a second objective lens 11, and a half-mirror 12.

The diffraction grating 6 is a diffraction grating having a one-dimensional transmissivity distribution in the direction perpendicular to the plane of the page; this diffraction grating generates diffracted light indicated by the broken line. In this technique, for reasons that will be described later, it is desirable that the diffraction grating have a narrow period in a range that allows projection of modulated illuminating light onto the sample in order to obtain a high spatial resolution.

A phase diffraction grating having a light path difference of ½ wavelength with respect to the wavelength of the light source is desirable as the diffraction grating. However, it is sufficient if sufficiently narrow sinusoidal illumination can be performed on the sample; accordingly, for example, illumination with inclined light can be performed on a grating having a period in the vicinity of the image focusing limit, in which the transmissivity is modulated, or a light blocking plate can be disposed in a plane that is conjugate with the pupil of the objective lens so that only ±first-order light can pass through a diffraction grating having a period that allows focusing of the diffraction of ±first-order light as an image.

The ±first-order light is separated by the diffraction grating 6 so that the respective light beams pass through the peripheral portions of the condenser lens 7, and the +first-order light and −first-order light form respective spots in positions on the peripheral portions of the return mirror. Here, the opening aperture 4 is adjusted so that there is no overlapping of the ±first-order light on the return mirror 8. In cases where monochromatic light is utilized as the light source, there is no overlapping of the ±first-order light; in such a case, therefore, this opening aperture may be omitted.

The ±first-order light deflected by the return mirror 8 passes through the edge portions of the pupil plane 14 of the objective lens, and the light beams interfere with each other in the vicinity of the sample 15, so that illumination is performed with illuminating light having a fringe structure.

Photography is performed by the image pickup device 17. N images are acquired while the period is accurately shifted by 1/N in the direction perpendicular to the respective grating patterns by a diffraction grating driving device (not shown in the figures). However, N is 4 or greater, and is preferably as large as possible.

An image of the sample is formed by calculating the plurality of acquired images by the calculating means 19. The contents of the calculations will be shown next.

In a microscope optical system having a point image intensity distribution $P_r(x)$, when illumination having a certain intensity distribution is applied to the sample $O_r(x)$, the diffracted light in the sample is subjected to spatial modulation. In the case of sinusoidal illumination having a single spatial frequency component K, three modulated components, i.e., a zero-order component and ±first-order components, are obtained as spatially modulated components.

If this spatial modulation is expressed as $$m_l(\exp(ilKx+\phi)), (l=-1,0,1)$$

then the sample images subjected to spatial modulation can be expressed as follows:

[Numerical Expression 1]

$$I_r(x) = \sum_l m_l(O_r(x)\exp(ilKx+i\phi)) * P_r(x) \quad (1)$$

Here, * indicates convolution integration

Below, the quantity in real space is expressed by the attachment of a subscript r, and the quantity in fractional space is expressed by the attachment of a subscript k.

If Equation (1) is subjected to a Fourier transform, and expressed in wave number space, we obtain the following:]

[Numerical Expression 2]

$$I_k(k) = \sum_l m_l \exp(il\phi) O_k(k+lK) P_k(k) \quad (2)$$

Here, the Fourier transform $P_k(k)$ of $P_r(x)$ expresses the transfer function of the optical system (OTF: optical transfer function).

$O_k(k-K)$ and $O_k(k+K)$ corresponding to $l=-1$ and $l=1$ in Equation (2) mean that the spatial frequency component of the sample is shifted by the spatial frequency K of the illumination, so that even in the case of a microscope optical system in which only the spatial frequency component $P_k(k)$ can be acquired, the high spatial frequency component of the sample can be acquired. Accordingly, it is desirable that the period of the illumination pattern be as short as possible in a range that allows focusing by this microscope optical system.

When image pickup is performed while shifting the grating as described above, N images having the same modulation frequency and modulation amplitude, and having only a different modulation phase $\phi$, are obtained. In this case, if the structured illumination phase of the jth image is expressed as $\phi_j$, then the intensity $I_{kj}(k)$ of the jth image signal is as follows:

[Numerical Expression 3]

$$I_{kj}(k) = \sum_l m_l \exp(il\phi_j) O_k(k+lK) P_k(k) \quad (3)$$

Accordingly, N equations are obtained.

In these equations, $O_k(k+lK)$, ($l=-1, 0, 1$) are unknowns; accordingly, these can be solved at N=3, but if noise is contained in the picked-up images $I_{kj}(k)$, the effect of this noise will cause the results obtained to be inaccurate. In cases where noise is thus contained in the observed quantities, as many images are picked up as possible, and it was discovered that the method of least squares is useful as a method for deriving values that are close to the true values from the unknowns.

Accordingly, the most reasonable $O_k(k+lK)$ can be determined by applying the method of least squares to the N>3 images described above.

In concrete terms, setting $b_{lj}=m_l\exp(i\phi_j)$, $O_k(k+lK)P_k(k)$ is determined by solving

[Numerical Expression 4]

$$\begin{pmatrix} \sum_j b_{-1j} I_{kj}(k) \\ \sum_j b_{0j} I_{kj}(k) \\ \sum_j b_{1j} I_{kj}(k) \end{pmatrix} = \begin{pmatrix} \sum_j b_{-1j}^2 & \sum_j b_{-1j}b_{0j} & \sum_j b_{-1j}b_{1j} \\ \sum_j b_{0j}b_{-1j} & \sum_j b_{0j}^2 & \sum_j b_{0j}b_{1j} \\ \sum_j b_{1j}b_{-1j} & \sum_j b_{1j}b_{0j} & \sum_j b_{1j}^2 \end{pmatrix} \begin{pmatrix} O_k(k-K)P_k(k) \\ O_k(k)P_k(k) \\ O_k(k+K)P_k(k) \end{pmatrix} \quad (4)$$

Since the signal is subjected to (as it were) averaging by the method of least squares processing described above, $O_k(k+lK)P_k(k)$ in which the effect of noise superimposed on the original image is suppressed to a low value can be determined.

Since $P_k(k)$ is known, or can be measured beforehand, $O_k(k+lK)$ can be determined. Here, $O_k(k+lK)$ can also be determined simply by dividing $O_k(k+lK)P_k(k)$ by $P_k(k)$; however, it is desirable to use a publicly known method that is not susceptible to the effects of noise, such as a Wiener filter.

The detectable range of $P_k(k)$ of a microscope optical system in a case where illumination that does not have an intensity distribution is applied is $k=-2NA/\lambda$ to $2NA/\lambda$ with respect to the light wavelength $\lambda$ and NA of the objective lens. Consequently, for $l=-1, 0, 1$, $O_k(k+lK)$ obtained as described above contains the information of $k=-2NA/\lambda-K$ to $2NA/\lambda-K$, $k=-2NA/\lambda$ to $2NA/\lambda$, and $k=-2NA/\lambda+K$ to $2NA/\lambda+K$. Accordingly, $O_k(k+lK)$ overall contains information from $k=-2NA/\lambda-K$ to $2NA/\lambda+K$, so that microscopic images having a high resolution can be obtained by redefining this as $O_k(k)$, performing a Fourier transform, and returning this to real space information $O_r(x)$.

The images obtained as a result have a high resolution only in the one-dimensional direction in which spatial modulation is performed; however, a microscope which has a high two-dimensional resolution can be constructed by varying the direction in which spatial modulation is performed to at least two directions, and performing processing similar to the one-dimensional processing for these respective directions.

Alternatively, a microscope having a high resolution in two directions can be constructed by constructing simultaneous equations by the method of least squares in two dimensions for spatially modulated images in at least two directions, and solving these equations.

In concrete terms, for example, in cases where spatial modulation is performed in three directions, $O_{kd}(k+lK)P_k(k)$ is an unknown for the three directions $d=1, 2, 3$; accordingly, these may be determined. However, since the three zero-order diffraction components $O_{k1}(k)P_k(k)$, $O_{k2}(k)P_k(k)$ and $O_{k3}(k)P_k(k)$ are in common here, there are seven simultaneous equations, and if the number of images in the respective modulation directions is $N_d$ ($d=1, 2, 3$), then we obtain the following:

[Numerical Expression 5]

$$\begin{pmatrix} \sum_{j=j1,j2,j3} I_{kj}(k) \\ \sum_{j1} I_{kj1}(k)\exp(-i\phi_{j1}) \\ \sum_{j1} I_{kj1}(k)\exp(i\phi_{j1}) \\ \sum_{j2} I_{kj2}(k)\exp(-i\phi_{j2}) \\ \sum_{j2} I_{kj2}(k)\exp(i\phi_{j2}) \\ \sum_{j3} I_{kj3}(k)\exp(-i\phi_{j3}) \\ \sum_{j3} I_{kj3}(k)\exp(i\phi_{j3}) \end{pmatrix} = \quad (5)$$

-continued $$\begin{pmatrix} m_0(N_1+N_2+N_3) & m_{-1}\sum_{j1}\exp(-i\phi_{j1}) & m_{+1}\sum_{j1}\exp(i\phi_{j1}) & m_{-1}\sum_{j2}\exp(-i\phi_{j2}) & m_{+1}\sum_{j1}\exp(i\phi_{j2}) & m_{-1}\sum_{j3}\exp(-i\phi_{j3}) & m_{+1}\sum_{j1}\exp(i\phi_{j3}) \\ m_0\sum_{j1}\exp(-i\phi_{j1}) & m_{-1}\sum_{j1}\exp(-2i\phi_{j1}) & m_{+1}N_1 & 0 & 0 & 0 & 0 \\ m_0\sum_{j1}\exp(i\phi_{j1}) & m_{-1}N_1 & m_{+1}\sum_{j1}\exp(2i\phi_{j1}) & 0 & 0 & 0 & 0 \\ m_0\sum_{j2}\exp(-i\phi_{j2}) & 0 & 0 & m_{-1}\sum_{j2}\exp(-2i\phi_{j2}) & m_{+1}N_2 & 0 & 0 \\ m_0\sum_{j2}\exp(i\phi_{j2}) & 0 & 0 & m_{-1}N_2 & m_{+1}\sum_{j2}\exp(2i\phi_{j2}) & 0 & 0 \\ m_0\sum_{j3}\exp(-i\phi_{j3}) & 0 & 0 & 0 & 0 & m_{-1}\sum_{j3}\exp(-2i\phi_{j3}) & m_{+1}N_3 \\ m_0\sum_{j3}\exp(i\phi_{j3}) & 0 & 0 & 0 & 0 & m_{-1}N_3 & m_{+1}\sum_{j3}\exp(2i\phi_{j3}) \end{pmatrix}$$

$$\begin{pmatrix} O_k(k)P_k(k) \\ O_{k1}(k-K)P_k(k) \\ O_{k1}(k+K)P_k(k) \\ O_{k2}(k-K)P_k(k) \\ O_{k2}(k+K)P_k(k) \\ O_{k3}(k-K)P_k(k) \\ O_{k3}(k+K)P_k(k) \end{pmatrix}$$

The zero-order modulation component $O_k(k)P_k(k)$ and the ±first-order components $O_{kd}(k\pm K)P_k(k)$ for the three directions can be determined by solving these.

In this case, the problem is to determine seven unknowns by processing three or more images in structured illumination phases for spatial modulation in three directions. This is a state in which there is more data than unknowns.

In such a case, $O_{kd}(k+lK)P_k(k)$ cannot be uniquely determined without using the method of least squares. Accordingly, the method describe above is extremely effective in improving the two-dimensional resolution by varying the direction of one-dimensional modulation.

FIG. 1 shows an example of the construction of a microscope in which the phase of the illuminating light is modulated. In order from the light source, the illumination optical system is constructed from a lamp light source 1, a collector lens 2, a relay lens 3, an opening diaphragm 4, a filed lens 5, a diffraction grating 6, a condenser lens 7, a return mirror 8 disposed in a pupil-conjugate position, a relay lens 9, a visual field diaphragm 10, a second objective lens 11, and a half-mirror 12.

The diffraction grating 6 is a diffraction grating having a sinusoidal transmissivity distribution proceeding directly in the plane perpendicular to the optical axis. It is sufficient if the diffraction grating 6 has diffraction patterns in two directions in the plane perpendicular to the optical axis. It is not absolutely necessary that these patterns be orthogonal; however, since the calculation processing in such a case is simple, it is desirable that the patterns be orthogonal.

This diffraction grating generates diffracted light indicated by a broken line by means of a grating in the direction perpendicular to the plane of the page. Furthermore, diffracted light (not shown in the figures) that passes vertically through the plane of the page is generated by a grating oriented in the plane of the page. In order to obtain a high spatial resolution by means of the present technique, it is desirable that the diffraction gratings have a narrow period in the range that allows the modulated illuminating light to be projected onto the sample. Accordingly, what must be taken into account in the diffracted light is only the ±first-order light. It is desirable that the periods of the gratings in the two directions be the same; however, in cases where there is no problem if the resolution is different in the two directions, the periods in the two directions may be different.

It is necessary that the zero-order light components of the diffraction gratings be sufficiently small. Accordingly, phase diffraction gratings which are such that the light path difference is ½ wavelength with respect to the wavelength of the light source are desirable. However, it is sufficient if sufficiently narrow sinusoidal illumination can be performed with respect to the sample; accordingly, for example, illumination with inclined light can be performed on a grating having a period in the vicinity of the image focusing limit, in which the transmissivity is modulated, or a light blocking plate can be disposed in a plane that is conjugate with the pupil of the objective lens so that only ±first-order light can pass through a diffraction grating having a period that allows focusing of the diffraction of ±first-order light as an image.

The ±first-order light is separated by the diffraction grating 6 so that the respective light beams pass through the peripheral portions of the condenser lens 7, and the +first-order light and −first-order light form respective spots in positions on the peripheral portions of the return mirror. Here, the opening aperture 4 is adjusted so that there is no overlapping of the ±first-order light on the return mirror 8. In cases where monochromatic light is utilized as the light source, there is no overlapping of the ±first-order light; in such a case, therefore, this opening aperture may be omitted.

The ±first-order light deflected by the return mirror 8 passes through the edge portions of the pupil plane 14 of the objective lens, and the light beams interfere with each other in the vicinity of the sample 15, so that illumination is performed with illuminating light having a fringe structure.

Photography is performed by the image pickup device 17. Since the diffraction grating comprises gratings in two perpendicular directions, the surface of the sample is illuminated with grating patterns in two directly proceeding directions. Images are acquired while the position is accurately shifted by 1/N of the period in the directions of the respective grating patterns by a diffraction grating driving device not shown in the figures.

Specifically, N images are first acquired while the position is shifted by 1/N at a time in the direction of one grating (this is taken as the Y direction). Next, the position is shifted by 1/N in the direction of the other grating (this is taken as the X direction), and N images are then acquired while the position is shifted by 1/N at a time in the Y direction. Subsequently, this is repeated, so that $N^2$ images are acquired by shifting the position N times in the X direction as well.

When image pickup is performed while shifting the grating as described above, N images of the same phase in one grating pattern can be acquired; however, these images have a different modulation amplitude as a result of the other grating pattern. Specifically, where the x and y directions are the respective directions of the grating patterns described above, the structured illumination intensity $I_{ri}$ is generally written as follows:

$$I_{ri} = (1/4) I_{riO} (1 + \cos(K_x x + \phi_x))(1 + \cos(K_y y + \phi_y)) \tag{6}$$

Accordingly, if shifting is performed in the x direction so that $\phi_x = 0, \ldots, 2\pi j/N, \ldots, 2\pi(N-1)/N$, the illumination amplitude in the y direction at a specified x has a value that is proportional to $\cos(2\pi j/N)$. That is, images that have a different modulation amplitude are obtained.

An image of the sample is formed by calculation applied to the plurality of picked-up images by the calculation means 19. With regard to the calculation processing, the method described in the previous example may be applied by being expanded to two dimensions.

The invention claimed is:

1. An image forming method in which a sample is illuminated with sinusoidally spatially modulated illuminating light, light from the sample illuminated by the illuminating light is focused as an image, and a sample image is formed by image calculation processing from the acquired image, wherein a greater number of images than the number of spatially modulated components contained in the light emitted from the sample as a result of the illuminating light on the sample are acquired, and the sample image is formed by applying the method of least squares, which is shown by the following equation and in which complex numbers are considered, $$\begin{pmatrix} \sum_j b_{-1j} I_{kj}(k) \\ \sum_j b_{0j} I_{kj}(k) \\ \sum_j b_{+1j} I_{kj}(k) \end{pmatrix} = \tag{1}$$

$$\begin{pmatrix} \sum_j b_{-1j}^2 & \sum_j b_{-1j} b_{0j} & \sum_j b_{-1j} b_{+1j} \\ \sum_j b_{0j} b_{-1j} & \sum_j b_{0j}^2 & \sum_j b_{0j} b_{+1j} \\ \sum_j b_{+1j} b_{-1j} & \sum_j b_{+1j} b_{0j} & \sum_j b_{+1j}^2 \end{pmatrix} \begin{pmatrix} O_k(k-K) P_k(k) \\ O_k(k) P_k(k) \\ O_k(k+K) P_k(k) \end{pmatrix}$$

where $b_{lj} = m_l \exp(i\phi_j)$, $m_l$ is a modulated amplitude of the illuminating light, $\phi_j$ is a modulated phase of the jth one of images, $I_{kj}(k)$ is a signal intensity of the jth one of images, and $P_k(k)$ is a transfer function of the optical system, with the amount by which the plurality of picked-up images are varied when these images are picked up for each of the spatial frequency components constituting the plurality of picked-up images taken as a parameter.

2. The image forming method according to claim 1, wherein the plurality of images are acquired while varying the phase of the illuminating light pattern on the sample.

3. The image forming method according to claim 1, wherein the plurality of images are acquired while varying the modulation amplitude of the illuminating light on the sample.

4. The image forming method according to claim 1, wherein spatially modulated illuminating lights are in three directions and one zero-order light modulated component, three +first-order light modulated components and three −first-order light modulated components are separated by applying the method of least squares, which is shown by the following equation in place of Equation (1)

$$\begin{pmatrix} \sum_{j=j1,j2,j3} I_{kj}(k) \\ \sum_{j1} I_{kj1}(k) \exp(-i\phi_{j1}) \\ \sum_{j1} I_{kj1}(k) \exp(i\phi_{j1}) \\ \sum_{j2} I_{kj2}(k) \exp(-i\phi_{j2}) \\ \sum_{j2} I_{kj2}(k) \exp(i\phi_{j2}) \\ \sum_{j3} I_{kj3}(k) \exp(-i\phi_{j3}) \\ \sum_{j3} I_{kj3}(k) \exp(i\phi_{j3}) \end{pmatrix} = \tag{2}$$

$$\begin{pmatrix} m_0(N_1+N_2+N_3) & m_{-1}\sum_{j1}\exp(-i\phi_{j1}) & m_{+1}\sum_{j1}\exp(i\phi_{j1}) & m_{-1}\sum_{j2}\exp(-i\phi_{j2}) & m_{+1}\sum_{j2}\exp(i\phi_{j2}) & m_{-1}\sum_{j3}\exp(-i\phi_{j3}) & m_{+1}\sum_{j3}\exp(i\phi_{j3}) \\ m_0\sum_{j1}\exp(-i\phi_{j1}) & m_{-1}\sum_{j1}\exp(-2i\phi_{j1}) & m_{+1}N_1 & 0 & 0 & 0 & 0 \\ m_0\sum_{j1}\exp(i\phi_{j1}) & m_{-1}N_1 & m_{+1}\sum_{j1}\exp(2i\phi_{j1}) & 0 & 0 & 0 & 0 \\ m_0\sum_{j2}\exp(-i\phi_{j2}) & 0 & 0 & m_{-1}\sum_{j2}\exp(-2i\phi_{j2}) & M_{+1}N_2 & 0 & 0 \\ m_0\sum_{j2}\exp(i\phi_{j2}) & 0 & 0 & m_{-1}N_2 & m_{+1}\sum_{j2}\exp(2i\phi_{j2}) & 0 & 0 \\ m_0\sum_{j3}\exp(-i\phi_{j3}) & 0 & 0 & 0 & 0 & m_{-1}\sum_{j3}\exp(-2i\phi_{j3}) & m_{+1}N_3 \\ m_0\sum_{j3}\exp(i\phi_{j3}) & 0 & 0 & 0 & 0 & m_{-1}N_3 & m_{+1}\sum_{j3}\exp(2i\phi_{j3}) \end{pmatrix}$$

$$\begin{pmatrix} O_k(k)P_k(k) \\ O_{k1}(k-K)P_k(k) \\ O_{k1}(k+K)P_k(k) \\ O_{k2}(k-K)P_k(k) \\ O_{k2}(k+K)P_k(k) \\ O_{k3}(k-K)P_k(k) \\ O_{k3}(k+K)P_k(k) \end{pmatrix}$$

where

Nd is the number of images in respective modulation directions, $m_l$ is a modulated amplitude of the illuminating light, $\phi_j$ is a modulated phase of the jth one of images, $I_{kj}(k)$ is a signal intensity of the jth one of images, and $P_k(k)$ is a transfer function of the optical system.

5. A microscope device comprising:

a light source;

an illumination optical system that includes a diffraction grating which is disposed in a position that is optically conjugate with a sample and illuminates the sample with light sent from the light source and sinusoidally spatially modulated by the diffraction grating;

a modulation device that modulates the diffraction grating;

an image pickup means that picks up spatially modulated sample images from the sample; and an image forming device that forms a sample image by applying the method of least squares which is shown by the following equation and in which complex numbers are considered, $$\begin{pmatrix} \sum_j b_{-1j}I_{kj}(k) \\ \sum_j b_{0j}I_{kj}(k) \\ \sum_j b_{+1j}I_{kj}(k) \end{pmatrix} = \quad (3)$$

-continued $$\begin{pmatrix} \sum_j b_{-1j}^2 & \sum_j b_{-1j}b_{0j} & \sum_j b_{-1j}b_{+1j} \\ \sum_j b_{0j}b_{-1j} & \sum_j b_{0j}^2 & \sum_j b_{0j}b_{+1j} \\ \sum_j b_{+1j}b_{-1j} & \sum_j b_{+1j}b_{0j} & \sum_j b_{+1j}^2 \end{pmatrix} \begin{pmatrix} O_k(k-K)P_k(k) \\ O_k(k)P_k(k) \\ O_k(k+K)P_k(k) \end{pmatrix}$$

where $b_{lj}=m_l\exp(i\phi_j)$, $m_l$ is a modulated amplitude of the illuminating light, $\phi_j$ is a modulated phase of the jth one of images, $I_{kj}(k)$ is a signal intensity of the jth one of images, and $P_k(k)$ is a transfer function of the optical system, with the amount by which the plurality of picked-up images are varied when these images are picked up for each of the spatial frequency components constituting a greater number of images than the number of spatially modulated components contained in the light emitted from the sample as a result of the illuminating light on the sample (picked up by the image pickup means) taken as a parameter.

6. The microscope device according to claim 5, wherein the image pickup means picks up a plurality of images in which the phase of the illuminating light pattern on the sample is varied.

7. The microscope device according to claim 5, wherein the image pickup means picks up a plurality of images in which the modulation amplitude of the illuminating light on the sample is varied.

8. The microscope device according to any one of claims 5 to 7, wherein
   the diffraction grating has grating patterns in two directions in the plane perpendicular to the optical axis, and
   the modulation device moves the diffraction grating in the directions respectively perpendicular to these two directions.

9. The microscope device according to any one of claims 5 to 7, wherein
   the diffraction grating has a grating pattern in one direction in the plane perpendicular to the optical axis, and
   using a plurality of images obtained by illuminating the sample with spatially modulated lights in three directions, one zero-order light modulated component, three +first-order light modulated components and three −first-order light modulated components are separated by applying the method of least squares, which is shown by the following equation in place of Equation (3)

$$\begin{pmatrix} \sum_{j=j1,j2,j3} I_{kj(k)} \\ \sum_{j1} I_{kj1}(k)\exp(-i\phi_{j1}) \\ \sum_{j1} I_{kj1}(k)\exp(i\phi_{j1}) \\ \sum_{j2} I_{kj2}(k)\exp(-i\phi_{j2}) \\ \sum_{j2} I_{kj2}(k)\exp(i\phi_{j2}) \\ \sum_{j3} I_{kj3}(k)\exp(-i\phi_{j3}) \\ \sum_{j3} I_{kj3}(k)\exp(i\phi_{j3}) \end{pmatrix} = $$

(4)

$$\begin{pmatrix} m_0(N_1+N_2+N_3) & m_{-1}\sum_{j1}\exp(-i\phi_{j1}) & m_{+1}\sum_{j1}\exp(i\phi_{j1}) & m_{-1}\sum_{j2}\exp(-i\phi_{j2}) & m_{+1}\sum_{j2}\exp(i\phi_{j2}) & m_{-1}\sum_{j3}\exp(-i\phi_{j3}) & m_{+1}\sum_{j3}\exp(i\phi_{j3}) \\ m_0\sum_{j1}\exp(-i\phi_{j1}) & m_1\sum_{j1}\exp(-2i\phi_{j1}) & m_{+1}N_1 & 0 & 0 & 0 & 0 \\ m_0\sum_{j1}\exp(i\phi_{j1}) & m_{-1}N_1 & m_{+1}\sum_{j1}\exp(2i\phi_{j1}) & 0 & 0 & 0 & 0 \\ m_0\sum_{j2}\exp(-i\phi_{j2}) & 0 & 0 & m_{-1}\sum_{j2}\exp(-2i\phi_{j2}) & M_{+1}N_2 & 0 & 0 \\ m_0\sum_{j2}\exp(i\phi_{j2}) & 0 & 0 & m_{-1}N_2 & m_{+1}\sum_{j2}\exp(2i\phi_{j2}) & 0 & 0 \\ m_0\sum_{j3}\exp(-i\phi_{j3}) & 0 & 0 & 0 & 0 & m_{-1}\sum_{j3}\exp(-2i\phi_{j3}) & m_{+1}N_3 \\ m_0\sum_{j3}\exp(i\phi_{j3}) & 0 & 0 & 0 & 0 & m_{-1}N_3 & m_{+1}\sum_{j3}\exp(2i\phi_{j3}) \end{pmatrix}$$

$$\begin{pmatrix} O_k(k)P_k(k) \\ O_{k1}(k-K)P_k(k) \\ O_{k1}(k+K)P_k(k) \\ O_{k2}(k-K)P_k(k) \\ O_{k2}(k+K)P_k(k) \\ O_{k3}(k-K)P_k(k) \\ O_{k3}(k+K)P_k(k) \end{pmatrix}$$

where

Nd is the number of images in respective modulation directions, $m_j$ is a modulated amplitude of the illuminating light, $\phi_j$ is a modulated phase of the jth one of images, $I_{kj}(k)$ is a signal intensity of the jth one of images, and $P_k(k)$ is a transfer function of the optical system.

* * * * *